A. W. BENSON.
SELF TRAILING TRUCK.
APPLICATION FILED JUNE 4, 1915.
1,202,651.
Patented Oct. 24, 1916.
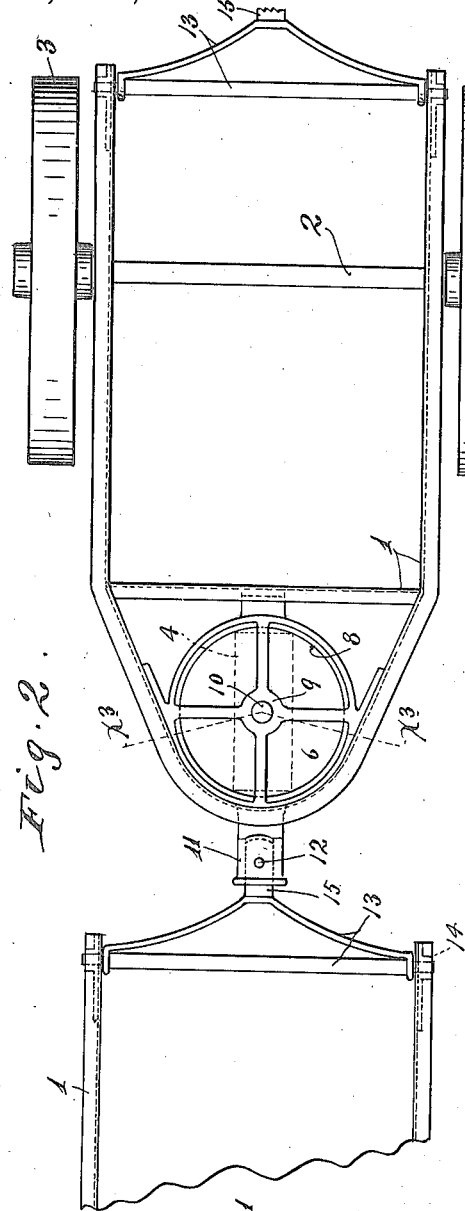
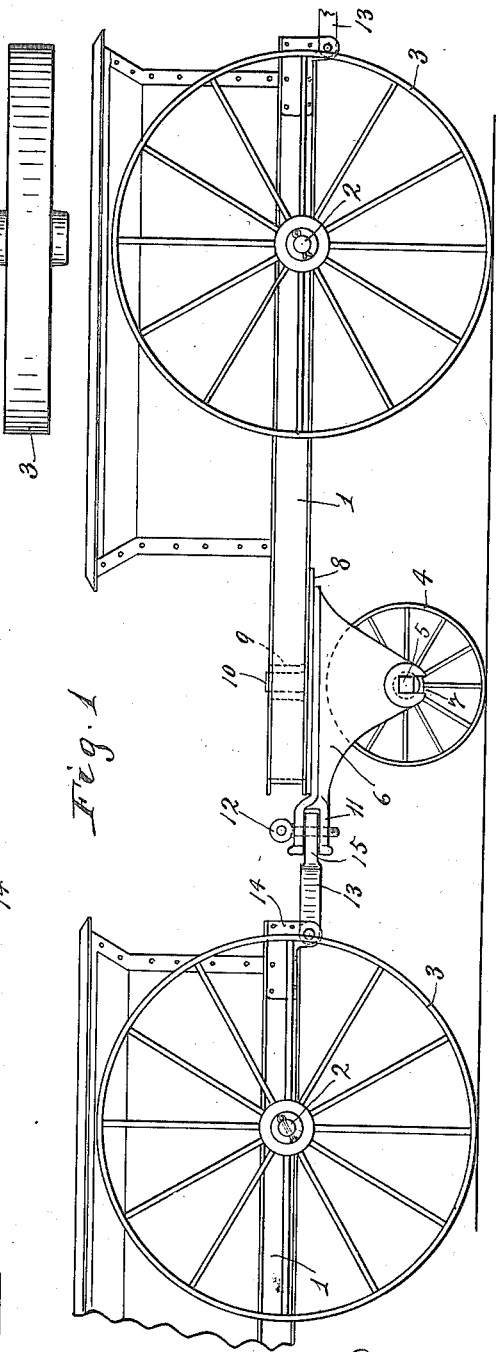
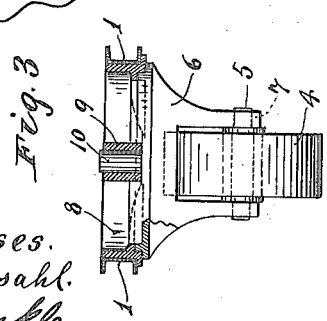
Witnesses.
A. H. Opsahl.
E. C. Skinkle.
Inventor.
A. W. Benson.
By his Attorneys
Williamson Merchant

UNITED STATES PATENT OFFICE.

ADOLPH W. BENSON, OF MINNEAPOLIS, MINNESOTA.

SELF-TRAILING TRUCK.

1,202,651. Specification of Letters Patent. Patented Oct. 24, 1916.

Application filed June 4, 1915. Serial No. 32,070.

*To all whom it may concern:*

Be it known that I, ADOLPH W. BENSON, a citizen of the United States, residing at Minneapolis, in the county of Hennepin and State of Minnesota, have invented certain new and useful Improvements in Self-Trailing Trucks; and I do hereby declare the following to be a full, clear, and exact description of the invention, such as will enable others skilled in the art to which it appertains to make and use the same.

My invention relates to self-tracking trucks adapted to be connected in a train with all of the trucks arranged to travel the same track.

This invention is in the nature of an improvement on the so-called lumber cart disclosed and claimed in the Marshall Patent, No. 660,020, of October 16th, 1900. In the said Marshall cart, a slack chain is extended across the rear end of the cart frame and this is used as an element for causing the carts to travel the same, or substantially the same track. Said slack chain, however, will not prevent the several carts from bunching up, that is the one from running ahead against the other and being thus thrown out of proper position, so that it will not properly trail, in going down hill.

My present invention provides an improvement in the connection between the two trucks or carts, so arranged that it will prevent the one cart from running ahead in going down hill and will cause the connected carts or trucks to properly trail or track, when going down hill, as well as when going up hill, or when running on a level.

In the accompanying drawings, which illustrate the invention, like characters indicate like parts.

Referring to the drawings: Figure 1 is a side elevation showing two trucks connected in accordance with my invention, some parts being broken away; Fig. 2 is a plan view of the parts shown in Fig. 1, but with the bodies or boxes of the trucks removed from the frames thereof; and Fig. 3 is a view partly in elevation and partly in section on the line $x^3-x^3$ on Fig. 2.

The trucks may, of course, take various forms. As shown, each truck comprises a channel iron framework 1, rear axle 2, rear wheels 3, centrally located front wheel 4, front axle 5, and front wheel bracket 6. The said front wheel bracket 6 is shown as bifurcated. That is, it is provided with depending side portions between which the front wheel 4 is located; and the axle 5 has squared ends set into downwardly opening notches 7 formed at the lower ends of the said depending portions of the said front wheel bracket 6. The upper portion of the wheel bracket 6 is formed with a flanged annular bearing, (see particularly Fig. 3), that fits a correspondingly formed annular bearing surface of a ring 8, (see particularly Fig. 3), that is rigidly secured to the bowed or yoke-like front portion of the frame 1. Also, as shown, the said ring 3 has a central hub 9 and the wheel bracket 6 has a pintle 10 channeled in the said hub. The front wheel bracket is thus mounted for horizontal oscillatory movements, on a structure that corresponds closely to what, in wagon construction, is designated as a fifth wheel.

The wheel bracket 6 is provided with a short forwardly projecting draw-bar 11, the front end of which is slightly bifurcated to form a coupling-head and the said coupling-head is provided with a slight perforation through which a coupling pin 12 is adapted to be passed. As a connection between the rear end of the one cart and the coupling head of the draw bar of a rear truck, I provide a so-called coupling bar 13. It is a rigid structure pivoted to the truck frame with freedom for vertical pivotal movements, but rigid against lateral and forward and rearward movements. As shown, this coupling bar 13 is provided at its ends with trunnions rigidly secured to the rear ends of the side bars of the frame 1. At its central portion, the coupling bar 13 has a rearwardly projecting coupling shank 15 that is adapted to fit in the bifurcated head 11 of the front wheel bracket 6 of the rear truck, with freedom, however, for horizontal pivotal movements. This shank 15 has a perforation through which the coupling pin 12 is adapted to be passed. Here it should be noted that when two trucks are coupled together, as shown in Figs. 1 and 2, the axis of the front wheel 4 of the rear truck and its brackets 6 is midway between the axes of the large wheels of the two connected trucks. This is important because in turning a curve, the said front wheel 4 will be kept at the same, or approximately the same angle, to the front and to the rear large wheels. As is evident, this is an action required to make the large wheels of the rear truck travel over the same, or approximately the same tracks that were traveled by the rear wheels of the front truck.

The pivotal connection between the coupling bar 13 and the coupling head of the draw bar 11 is, of course, necessary to enable the front wheel 4 to assume the different angular positions, above indicated, in traveling curves. The pivotal connection between the coupling bar 13 and the truck frame is required to permit the wheels of the several trucks to adapt themselves to irregularities in the ground, platform or other road bed. Some such movement could be allowed for by play between the shank 15 and coupling head, but the said pivotal connection between the frame 1 and the bar 13 would be required to provide for much road bed irregularity. The rigid coupling bar, as is evident, not only causes the wheels of the connected trucks to properly track, but positively holds the rear truck from running ahead in respect to a front truck, in running down hill. Obviously, with a flexible connection, in running down hill, when one truck runs onto the other, the front wheel of that truck would be swung out of tracking position and would cause the rear truck to run, either to one side or the other of the desired line of travel.

In a long train of trucks coupled as above described, the trucks will closely track each other and will make very abrupt turns such as required in turning short corners. Self-tracking trucks of this character are capable of general use wherever it is desired that a series of connected trucks should travel substantially the same tracks without the use of rails. They are very serviceable for handling lumber, dirt, freight or merchandise generally, and may be even found serviceable for passenger service in connection with automobiles. By the use of an automobile or tractor, a very long train of these trucks may be drawn where a close tracking or trailing action is required. In the specification and in the claims, it is stated that the front wheel bracket is pivoted to the front end of the truck frame; but it will be, of course, understood that this expression is a relative term used for convenience and that as a matter of fact the trucks may be run in either direction.

What I claim is:

1. In a truck, the combination with a frame and rear wheels journaled thereto, of a wheel equipped front wheel bracket pivoted to the front end of said frame and provided with a forwardly projecting coupling head, and a rigid coupling bar pivotally connected to the rear of said truck frame, with freedom for vertical movements, but rigid against forward and rearward and lateral movement, said coupling bar, at its central portion, having a projecting portion adapted to be pivotally connected to the head of the draw bar of the front wheel bracket of a rear truck.

2. In a truck, the combination with a frame and rear wheels journaled thereto, of a wheel-equipped front wheel bracket centrally pivoted to the front end portion of said frame and provided with a forwardly projecting integral draw bar terminating in a horizontally bifurcated coupling head, and a draw bar extended transversely across the rear portion of said truck frame and pivoted thereto for vertical oscillatory movement, and provided with a rearwardly projecting centrally located coupling shank adapted to be pivotally connected to the bifurcated head of the draw bar of a rear truck.

3. In a truck, the combination with a frame and rear wheels journaled thereto, of a truck wheel bracket centrally pivoted to the front portion of said frame and having laterally spaced depending flanges, and a front wheel located between and journaled to said flanges, the said wheel bracket having a forwardly projecting integral coupling head.

In testimony whereof I affix my signature in presence of two witnesses.

ADOLPH W. BENSON.

Witnesses:
 HARRY D. KILGORE,
 F. D. MERCHANT.